United States Patent [19]
Kim et al.

[11] Patent Number: 5,604,732
[45] Date of Patent: Feb. 18, 1997

[54] UP-LINK ACCESS APPARATUS IN DIRECT SEQUENCE CODE DIVISION MULTIPLE ACCESS SYSTEM

[75] Inventors: Je-Woo Kim, Suwon; Jong-Hyeon Park, Seoul, both of Rep. of Korea

[73] Assignee: SamSung Electronics Co., Ltd., Suwon, Rep. of Korea

[21] Appl. No.: 364,719

[22] Filed: Dec. 27, 1994

[30] Foreign Application Priority Data

Dec. 31, 1993 [KR] Rep. of Korea ............... 31814/1993

[51] Int. Cl.$^6$ ........................................... H04J 13/04
[52] U.S. Cl. ........................................ 370/342; 375/206
[58] Field of Search ........................... 375/200, 201, 375/202, 203, 204, 205, 206, 207, 208, 209, 210, 343, 349; 370/18, 19, 107, 104.1, 8, 9, 10, 11, 12; 380/34, 46; 455/38.1, 33.1, 54.1, 56.1

[56] References Cited

U.S. PATENT DOCUMENTS

| | | | |
|---|---|---|---|
| 4,470,138 | 9/1984 | Gutleber | 370/18 |
| 5,056,106 | 10/1991 | Wang et al. | 375/200 |
| 5,063,560 | 11/1991 | Yerbury et al. | 370/18 |
| 5,081,644 | 1/1992 | Uchida et al. | 375/200 |
| 5,101,417 | 3/1992 | Richley et al. | 375/206 |
| 5,103,459 | 4/1992 | Gilhousen et al. | 375/205 |
| 5,150,377 | 9/1992 | Vannucci | 375/206 |
| 5,175,744 | 12/1992 | Crespo et al. | 375/343 |
| 5,235,614 | 8/1993 | Bruckert et al. | 375/205 |
| 5,309,474 | 5/1994 | Gilhousen et al. | 375/205 |
| 5,319,672 | 6/1994 | Sumiya | 375/208 |
| 5,327,455 | 7/1994 | De Gaudenzi et al. | 375/205 |
| 5,343,496 | 8/1994 | Honing et al. | 375/205 |
| 5,345,468 | 9/1994 | Bi | 375/205 |
| 5,363,403 | 11/1994 | Schilling et al. | 375/205 |
| 5,422,952 | 6/1995 | Kennedy et al. | 370/18 |

*Primary Examiner*—Douglas W. Olms
*Assistant Examiner*—Dang Ton
*Attorney, Agent, or Firm*—Robert E. Bushnell, Esq.

[57] ABSTRACT

Disclosed is a link access apparatus of a CDMA system using a DS/SS communication method, and more particularly an up-link access apparatus which overcomes a near/far problem occurring when mobile stations and a base station perform multiple access communication using code division. An up-link access apparatus in a DS/SS-CDMA system has a transmitter for mixing data to be transmitted to a base station with a PN code unique to that mobile station to thereby PN code modulate the data. The transmitter then mixes the PN code modulated data with a carrier having a frequency that is shifted by an identification frequency to thereby output a spread spectrum signal. The apparatus further includes a receiver for mixing a demodulation carrier made up of the PN code and the identification frequency with the spread spectrum signal from the transmitter to thereby output a mixed signal. The mixed signal is then integrated according to a period having a reciprocal corresponding to the identification frequency, demodulated and output as a digital signal.

20 Claims, 3 Drawing Sheets

UP-LINK ACCESS APPARATUS IN DIRECT SEQUENCE CODE DIVISION MULTIPLE ACCESS SYSTEM

CROSS-REFERENCE TO RELATED APLICATIONS

This application makes reference to, incorporates the same herein, and claims all benefits incurring under 35 C.F.R. §119 from an application for *Up-Link Access Apparatus In Direct Sequence Code Division Multiple Access System* filed in the Korean Industrial Property Office on 31 Dec. 1993 and assigned Ser. No. 31814/1993.

FIELD OF THE INVENTION

The present invention relates to a link access apparatus of a code division multiple access system (CDMA) using a direct sequence spread spectrum (DS/SS) communication method, and more particularly to an up-link access apparatus which minimizes a "near/far" effect occurring when mobile stations and a base station perform multiple access by code division.

BACKGROUND OF THE INVENTION

The potential demand for wireless communications combined with restricted availability of the radio frequency spectrum has motivated intense research into bandwidth efficient multiple access schemes. One approach resulting from this pursuit has been the use of direct sequence spread spectrum-code division multiple access (i.e. DS/SS-CDMA) communication. Such a technique takes advantage of available bandwidth on the applicable transmission medium by generating a set of pulses in the time domain which have appropriate correlation properties over predetermined time periods.

Direct sequence spread spectrum (DS/SS) radio transmission systems, in contrast to more traditional radio transmission systems, use a signal bandwidth that is much broader than the information signal bandwidth. A wide band signal is generated by multiplying the narrowband information signal with a binary code, often designated as a spreading or pseudo-noise (PN) code, to generate the wideband signal that is transmitted. The original information signal can be re-created at the receiver by multiplying the received wideband signal by the same binary code (now designated as a de-spreading or pseudo-noise code) used to generate the wideband transmitted signal. In order to recover the intelligence the spreading and de-spreading codes must be in synchronism and have matching amplitudes.

Direct sequence spread spectrum transmission technology is now being applied to multi-user transmission systems such as cellular radio telephone systems. In such applications it is designated as code division multiple access (CDMA) to distinguish it from the prior time division multiple access (TDMA) and frequency division multiple access (FDMA) systems now in use. In the CDMA system the individual user channels (which are not distinguished by time of transmission or frequency differences) are each individually identified by a unique spreading and de-spreading code at both the transmitting and receiving end which is used to recover the individual user's signal from the signals of other users and from background noise and interference.

One system that has recognized the attendant advantages of the aforementioned technique is disclosed in U.S. Pat. No. 5,150,377 entitled *Direct Sequence Spread Spectrum (DSSS) Communications System With Frequency Modulation Utilized To Achieve Spectral Spreading* issued to Vannucci on 22 Sep. 1992. In this invention, the spectral spreading technique of a code-division multiple access (CDMA) system is generalized by extending the range of values allotted to the spreading waveform code signal to include complex numbers of unity magnitude. While this invention may be useful in its own right, we believe it can be improved upon in order to reduce the amount of interference that results when propagation distances between the respective mobile stations are different.

Another system taking advantage of the favorable characteristics of spread spectrum communication is disclosed in U.S. Pat. No. 5,175,744 entitled *Spread-Time Code Division Multiple Access Technique With Arbitrary Spectral Shaping* issued to Yerbury et al. on 5 Nov. 1991. In this system, pseudo-random noise (PN) sequences are assigned to each transmitter and the Fourier transform of the transmitter pulse is determined by modulating the phase of the desired transmitter spectrum by the pseudo-random (PN) sequence assigned to the transmitter. This invention, like Vanucci '377, contains merit in its own respect. We believe, however, that interference between incoming signals can be reduced further by using our disclosed techniques.

One early effort that specifically addresses the removal of interference between incoming signals (e.g. when the incoming signals propagate along paths of unequal distance) is U.S. Pat. No. 5,099,493 entitled *"Multiple Signal Receiver For Direct Sequence, Code Division Multiple Access, Spread Spectrum Signals"* issued on 24 May 1992 to Zegar et al. This reference teaches a method for enabling the level of signals received from a plurality of mobile stations to be constant. This is accomplished by identifying the signal outputs received from the plurality of mobile stations, and selectively amplifying and attenuating the received signals to thereby overcome the problems associated with a "near-far" effect, caused by the aforementioned circumstances of incoming signals propagating along paths of unequal distance.

In this prior art method, however, it is very difficult to adjust the high-frequency outputs of the plurality of mobile stations so that their respective output levels are identical to each other. Moreover, many difficulties are associated with a product capable of performing this method since a high degree of accuracy is required for executing this type of adjustment.

SUMMARY OF THE INVENTION

Accordingly, it is an object of the present invention to provide an improved up-link access apparatus in a direct sequence spread spectrum-code division multiple access (DS/SS-CDMA) system.

It is another object to provide an up-link access apparatus in a DS/SS-CDMA system which overcomes the problems associated with the "near-far" effect that occur when multiple mobile stations access a base station using code division.

It is still another object to provide an up-link access apparatus which assigns a unique identification frequency to each mobile station.

It is yet another object to provide an up-link apparatus that provides minimal signal interference among signals when the signals are demodulated at a base station by using identification frequencies unique to each mobile station, thereby overcoming the "near-far" effect.

To achieve these and other objects, the present invention provides an up-link access apparatus in a DS/SS-CDMA system comprising a transmitter for mixing data and transmitting the mixed data to a base station. The transmitter uses a PN code unique to the transmitter and modulates the data using the PN code. The PN code modulated data is then mixed with a carrier having a bandwidth that is shifted by an identification frequency which is also unique to the transmitter. The resulting signal is then output as a spread spectrum signal. The system is further comprised of a receiver for generating a demodulation carrier by mixing the unique PN code with the unique identification frequency. The demodulation carrier is mixed with the spread spectrum signal output from the transmitter to generate a mixed signal. The mixed signal is then integrated and the integrated signal is output to a decision circuit for demodulation and output as a digital signal.

BRIEF DESCRIPTION OF DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PRESENT INVENTION

Figure 1:
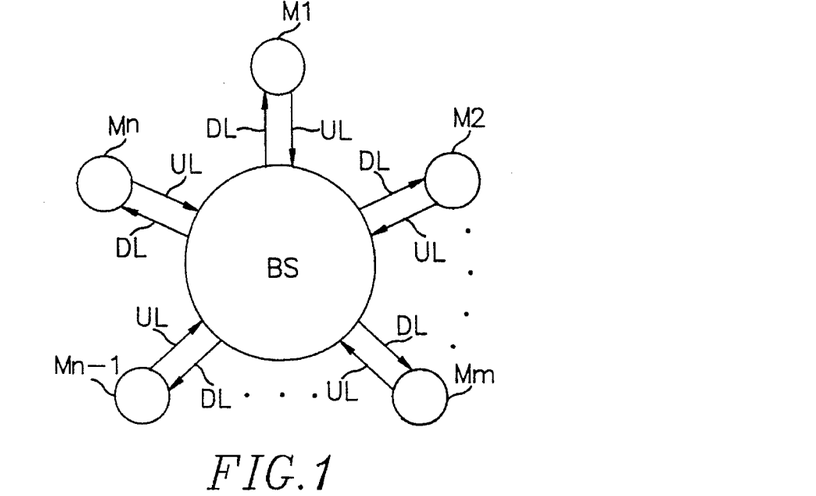
FIG. 1 is a block diagram showing the general structure of a DS/SS-CDMA system.

Referring to FIG. 1, a direct sequence spread spectrum-code division multiple access system (hereinafter referred to as DS/SS-CDMA) is shown. In FIG. 1, a plurality of mobile stations M1, M2, . . . Mm, . . . Mn-1, Mn (hereinafter referred to as M1-Mn) are configured to have multiple access to a base station BS using code division. Communication in this DS/SS-CDMA system is enabled by using a down-link DL as a speech access path from base station BS to mobile stations M1-Mn and by using an up-link UL as a speech access path from mobile stations M1-Mn to base station BS. To implement such communication, base station BS includes a transmitter for enabling multiple access to any one of the plurality of mobile stations M1-Mn.

Figure 2:
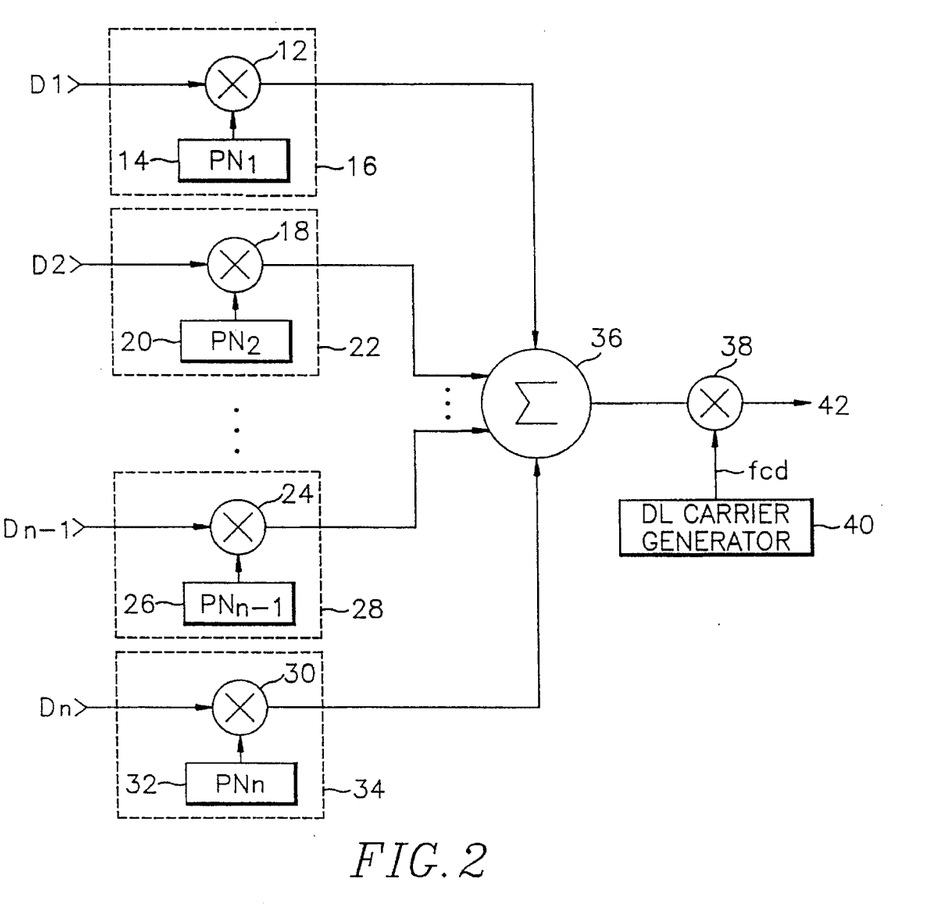
FIG. 2 is a block diagram showing a conventional transmitter that can be implemented in the DS/SS-CDMA system of FIG. 1 for executing down-link access from a base station BS to mobile stations M1-Mn.

FIG. 2 is a block diagram showing a conventional transmitter, such as one used in base station BS of the DS/SS-CDMA system of FIG. 1, for executing down-link access. The transmitter includes pseudo noise (PN) modulation devices 16, 22, 28 and 34 in which base band data D1, D2, . . . , Dn-1, Dn (hereinafter referred to as D1-Dn) to be transmitted to respective mobile stations M1-Mn are PN code modulated by PN codes unique to the respective mobile stations M1-Mn. Thereafter, the PN code modulated signals are then output to the respective mobile stations M1-Mn. Base band data D1-Dn represents data that is to be transmitted from base station BS to mobile stations M1-Mn; the signals modulated and output from PN modulation devices 16, 22, 28 and 34 are spread spectrum signals. The transmitter shown in FIG. 2 is further comprised of an adder 36 for adding and outputting the PN code modulated signals output from PN modulation devices 16, 22, 28 and 34, and a mixer 38 for mixing the output of adder 36 with a down-link carrier frequency fed generated from a down-link carrier generator 40 to thereby transmit the mixed signal to an output terminal 42. The down-link carrier frequency fed generated from down-link carrier generator 40 is maintained at the same frequency regardless of base band data D1-Dn being transmitted to mobile stations M1-Mn. Output terminal 42 represents an output terminal of base station BS and enables communication with each of the mobile stations M1-Mn.

In the construction of FIG. 2, each of the PN modulation devices 16, 22, 28 and 34 is comprised of a PN code generator for generating a PN code that is unique to a respective PN modulation device and mobile station, and a mixer for mixing base band data D1-Dn being transmitted to mobile stations M1-Mn with the PN code generated from the PN code generator to output a PN code modulated signal. Reference numerals 14, 20, 26 and 32 respectively represent PN code generators contained in PN modulation devices 16, 22, 28 and 34 and reference numerals 12, 18, 24 and 30 respectively represent mixers contained in PN modulation devices 16, 22, 28 and 34. PN code generators 14, 20, 26, 32 each generate a different PN code, depending upon the mobile station to which base band data D1-Dn is being transmitted.

Figure 3:
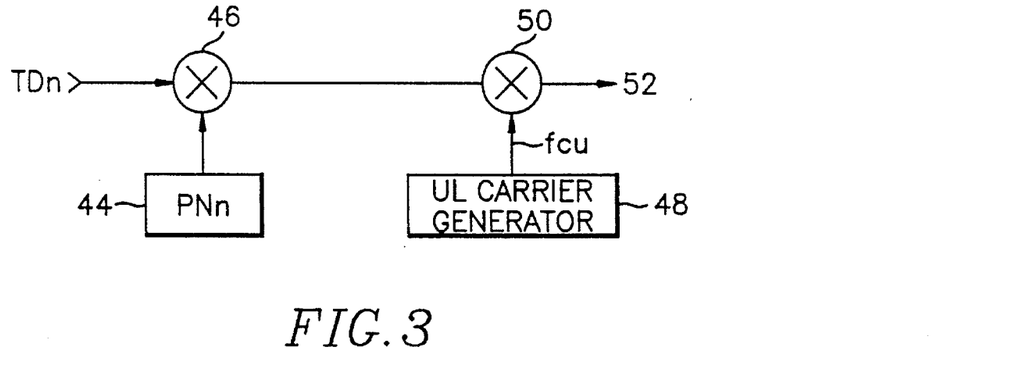
FIG. 3 is a block diagram showing a conventional transmitter for performing up-link access from an n-th mobile station Mn to the base station BS in the general DS/SS-CDMA system of FIG. 1.

FIG. 3 is a block diagram showing a transmitter for up-link access in a general DS/SS-CDMA system, such as the one depicted in FIG. 1. This transmitter executes up-link access within mobile stations M1-Mn, for example, within the n-th mobile station Mn of the DS/SS-CDMA system.

The up-link access transmitter of FIG. 3 is comprised of a mixer 46 for mixing data TDn being transmitted to base station BS with a PN code PNn unique to the particular mobile station generated from a PN code generator 44. Mixer 46 outputs a PN code modulated signal to another mixer 50 for mixing the PN code modulated signal output with an up-link carrier frequency fcu output from an up-link carrier generator 48. Mixer 50 outputs a mixed signal to an output terminal 52. The PN code PNn generated from PN code generator 44 represents a coding scheme that is unique to that particular mobile station. Output terminal 52 is provided to enable communication between the mobile station and the base station BS.

The data TDn transmitted to base station BS is mixed with PN code PNn generated from PN code generator 44 in mixer 46 to generate a PN code modulated signal. This PN code modulated signal is then output to mixer 50. Mixer 50 mixes the PN code modulated signal output from mixer 46 with the up-link carrier frequency fcu generated from up-link carrier generator 48 to output a mixed signal at output terminal 52.

In the conventional DS/SS-CDMA communication system discussed above, when data is transmitted from a plurality of mobile stations to a base station, all of the mobile stations use an identical carrier. That is, each mobile station uses the same carrier frequency, but a different PN code. Therefore, the system is able to communicate with the various mobile stations since they use PN codes that are distinguishable from each other. In the DS/SS-CDMA communication system, the plurality of mobile stations use an identical carrier frequency and different PN codes corresponding to the respective mobile stations, so that up-link access to a base station can be implemented.

In conventional DS/SS-CDMA communication systems, a "near-far" effect often arises due to differences in propagation distances between the base station and the plurality of mobile stations. That is, even though two mobile stations transmit identical signals to the base station, the base station simultaneously receives a strong signal and a weak signal due to the difference in propagation distances from the two mobile stations to the base station. In this situation, the stronger signal interferes with the weaker signal. As a result of this interference, no accurate modulation and acquisition of the weaker signal is possible. This result associated with varying high-frequency output strengths of the signals attributable to differences in propagation distance, is termed the "near-far" effect.

In cases where multiple communication is executed between a plurality of mobile stations (each having a transmitter such as the one shown in FIG. 3) and a base station, there has been a problem in that the high-frequency outputs of the mobile stations must be accurately adjusted in order to identify the high-frequency outputs when they reach the base station.

Figure 4:
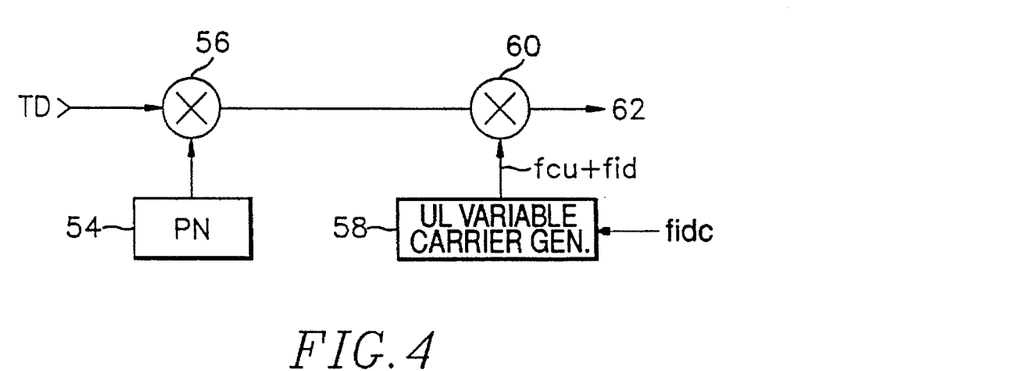
FIG. 4 is a block diagram showing a transmitter for performing up-link access from a mobile station to a base station in a DS/SS-CDMA system constructed according to the principles of the present invention.

Referring to FIG. 4, a transmitter for performing up-link access in a DS/SS-CDMA system constructed according to the principles of the present invention is shown. This transmitter should be viewed in contrast with the transmitter of FIG. 3 in order to appreciate the differences between the present invention and the conventional art.

In the construction of the transmitter of FIG. 4, a PN code generator 54 produces a PN code that is unique to the particular mobile station. A mixer 56 PN code modulates (i.e. spreads) the PN code generated from PN code generator 54 and base band data TD of the mobile station to output a PN code-modulated signal. An up-link variable carrier generator 58 generates a carrier fcu+fid comprised of an identification frequency fid unique to the particular mobile station and an up-link carrier frequency fcu. A mixer 60 then mixes the PN code-modulated signal output from mixer 56 with the carrier fcu+fid generated from up-link variable carrier generator 58 to modulate and transmit the mixed signal to an output terminal 62.

In FIG. 4, assuming the transmitter is part of the n-th mobile station Mn, the PN code generated from PN code generator 54 can be represented as "PNn", and the carrier output from up-link variable carrier generator 58 as "fcu+fnid". Furthermore, the signal transmitted to output terminal 62 of the n-th mobile station Mn is represented as Rn(t) and is expressed in equation (1) as:

$$Rn(t)=dn(t)Pn(t) \cos[2\pi fcu(t)+2\pi fnid(t)+\phi n] \quad (1)$$

In equation (1), dn(t) represents base band data TDn of n-th mobile station Mn to be transmitted to base station BS, Pn(t) represents the PN code of n-th mobile station Mn, fnid(t) represents the identification frequency of n-th mobile station Mn, and φn represents an initial phase of the data transmitted from n-th mobile station Mn.

Figure 5:
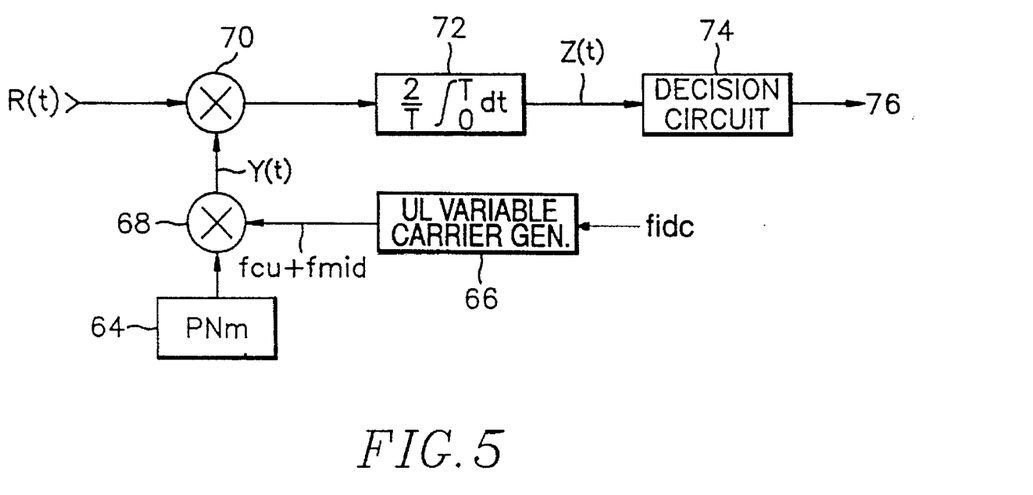
FIG. 5 is a block diagram showing a demodulator of a base station for executing up-link access in a DS/SS-CDMA system constructed according to the principles of the present invention.

Referring now to FIG. 5, a block diagram of a demodulator for executing up-link access in a DS/SS-CDMA system constructed according to the principles of the present invention is shown. This demodulator is contained in base station BS and demodulates outputs from the transmitter of FIG. 4.

In the construction of the demodulator, a PN code generator 64 generates a PN code PNm of an m-th mobile station Mm. An up-link variable carrier generator 66 generates an up-link carrier frequency fcu mixed with the identification frequency fmid of m-th mobile station Mm. A mixer 68 mixes the PN code PNm produced from PN code generator 64 with the up-link carrier fcu+fmid output from up-link variable carrier generator 66 and outputs the mixed signal as a demodulation carrier Y(t). A mixer 70 mixes the spread spectrum signal R(t) transmitted from mobile station Mm with demodulation carrier Y(t) output from mixer 68. An integrator 72 integrates the output of mixer 70, and then outputs an integrated result Z(t) to a decision circuit 74 which operates upon output Z(t) of integrator 72 to recover data transmitted from m-th mobile station Mm.

Up-link variable carrier generator 66 generates the carrier fcu+fmid comprised of up-link carrier fcu and identification frequency fmid corresponding to mobile station Mm, and transmits the carrier fcu+fmid to mixer 68 in response to input of an identification variable frequency signal fidc.

A detailed description of the operation of the DS/SS-CDMA system constructed according to the principles of the present invention for overcoming the "near-far" effect will be hereinafter described with reference to FIGS. 1, 4 and 5.

It is assumed that mobile stations M1-Mn each generate their unique PN code and identification frequency fid in response to a command received from base station BS when mobile stations M1-Mn are to access base station BS by transmitting and/or receiving a control signal between base station BS and mobile stations M1-Mn. Transmission and reception of the control signal between base station BS and mobile stations M1-Mn can be performed using typical transmitting and receiving methods. A description of these methods will not be given since they are not the main subject of the present invention.

When base station BS and mobile stations M1-Mn transmit and receive the control signal as mentioned above, mobile stations M1-Mn generate and output their corresponding PN code s and carrier fcu+fid from PN code generator 54 and up-link variable carrier generator 58 shown in FIG. 4, respectively.

During this time, up-link variable carrier generator 58 generates and outputs a spread spectrum signal in response to input of identification variable frequency signal fidc. That is, carrier fcu+fid, which is made up of up-link carrier fcu and identification frequency fid, is generated in response to identification variable frequency signal fidc.

Assuming that mobile stations M1-Mn communicate with base station BS by the operation discussed above, each one of the mobile stations M1-Mn is assigned a different PN code and a different identification frequency fid. The identification frequencies fid of mobile stations M1-Mn serve to identify a particular one of the mobile stations M1-Mn. This minimizes errors which can occur during demodulation since mutual interference between signals transmitted from respective mobile stations can be reduced.

As stated above, when mobile stations M1-Mn, which each have a separate identification frequency fid, transmit data to base station BS, mixer 56 receives transmission data TD. In the discussion that follows, it will be assumed for purposes of notation that the transmitter of FIG. 4 is a component of the m-th mobile station Mm.

Mixer 56 mixes received transmission data TDm with PN code PNm generated from PN code generator 54, and then applies the PN code modulated signal to mixer 60. That is, mixer 6 spreads the received transmission data TDm using PN code PNm to output a spread spectrum signal to mixer 60.

Next, mixer 60 mixes carrier fcu+fmid generated from up-link variable carrier generator 58 with the PN code modulated signal generated from mixer 56 and transmits the mixed signal to base station BS via output terminal 62.

During this time, up-link variable carrier generator 58 not only generates up-link carrier fcu, but also outputs the carrier fcu+fmid made up of up-link carrier fcu and identification frequency fmid to mixer 60, in response to an input of the identification variable frequency signal fidc previously established by the transmission/reception of the control signal, as discussed above. That is, up-link variable carrier generator 58 outputs carrier fcu+fmid, which is comprised of up-link carrier fcu phase-shifted by identification frequency fmid, in response to input of identification variable frequency signal fidc.

Since a separate identification frequency fid is assigned to each one of the mobile stations M1-Mn, it can be appreciated that the carriers to be transmitted from the respective mobile stations M1-Mn to the base station BS are distinguishable by their respective identification frequencies fid.

Referring now to FIG. 5, an explanation of the demodulation in base station BS of signals received from a corresponding mobile station having a distinguishable identification frequency fid will hereinafter be given.

In FIG. 5, a signal R(t) is received by the demodulator of base station BS from respective mobile stations M1-Mn. This signal, R(t), is expressed in equation (2) below. Since equation (1) given above indicates only the signal received by the demodulator of base station BS from n-th mobile station Mn, equation (2) below is obtained by expanding equation (1).

$$R(t) = \sum_{k=1}^{n} R_k(t) = \sum_{k=1}^{n} dk(t)Pk(t)\text{COS}[2\pi fcu(t) + 2\pi fkid(t) + \phi k] \quad (2)$$

In equation (2), "k" is a parameter representing that the number of mobile stations equals n. The received signal R(t) represents a signal in which data transmitted from the respective mobile stations M1-Mn is mixed.

PN code generator 64 shown in FIG. 5 generates a PN code identical to the PN code of the m-th mobile station Mm, and then outputs this PN code PNm to mixer 68. Mixer 68 then mixes carrier fcu+fmid output from up-link variable carrier generator 66 with PN code PNm output from PN code generator 64, thereby generating demodulation carrier Y(t), as indicated in equation (3) below. Demodulation carrier Y(t) is then applied to mixer 70.

$$Y(t) = P_m(t)\text{COS}[2\pi fcu(t) + 2\pi fmid(t)] \quad (3)$$

In equation (3), Pro(t) represents the PN code generated from PN code generator 64, and fmid(t) represents the identification frequency output from up-link variable carrier generator 66 in the demodulator of base station BS for m-th mobile station Mm.

Mixer 70 mixes received signal R(t) represented in equation (2) with demodulation carrier Y(t) represented in equation (3). The resulting mixed signal is then transmitted to integrator 72. Integrator 72 integrates the mixed signal from mixer 70 and outputs a signal Z(t). Signal Z(t) output from integrator 72 is represented in equation (4) as follows.

$$Z(t) = \frac{2}{T} \int_0^T dk(t)Pk(t)Pm(t)\text{COS}[2\pi fcu(t) + 2\pi fkid(t) + \pi n] \cdot \quad (4)$$

$$\text{COS}[2\pi fcu(t) + 2\pi fmid(t)]d(t)$$

In equation (4), the 1/T is assigned to be identical to or lower than the data rate of a received base band signal. Assuming that many carriers are received by mixer 70, equation (4) may be simplified and represented by the following equation (5).

$$Z(t) = dk(t)\frac{2}{T} pk,m \int_0^T \frac{1}{2} [\text{COS}[2\pi(fcu(t) - fkid(t) + \phi k] + \quad (5)$$

$$\text{COS}[4\pi fcu(t) + 2\pi(fkid + fmid)t + \phi k]]dt \approx$$

$$dk(t)pk,m\frac{1}{T} \int_0^T \text{COS}[2\pi(fkid - fmid)t + \phi k]dt$$

In equation (5), pk, m $$\int_0^T Pk(t)Pm(t)dt$$

and the development of this expression is indicated by the following equation (6).

$$Z(t) \approx dk(t)pk,m \frac{\sin[2\pi(fkid - fmid)t + \phi k]}{2\pi(fkid - \pi fmid)} \bigg|_0^T \quad (6)$$

In equation (6), if the "fkid-fmid" quantity corresponds to an integer multiple of 1/T, that is, if the difference between the identification frequency fmid of m-th mobile station Mm and the identification frequencies fkid of each of a plurality of mobile stations, except the m-th mobile station Mm, corresponds to an integer multiple of 1/T, the output signal Z(t) from integrator 72 has a value of "0" regardless of the correlation of PN codes between mobile stations M1-Mn. As a result, it can be appreciated that signals transmitted from the respective mobile stations, save m-th mobile station Mm, do not exist.

In this situation, since the transmission signal from m-th mobile station Mm includes carrier fcu and identification frequency fmid, the clement "fkid-fmid" of equation (6) equals zero, and output signal Z(t) of integrator 72 contains only base band data dk(t) from mobile station Mm. Hence, only the signal transmitted from m-th mobile station Mm to base station BS is output from integrator 72.

When signals transmitted from the respective mobile stations are demodulated in base station BD, mutual interference between signals can be reduced by having a frequency difference in the carriers of the respective mobile stations equal to a frequency corresponding to the reciprocal of the integral time (i.e. period) T of integrator 72, thereby effectively overcoming the problems associated with the "near-far" effect.

Since the frequency range fkid-fmid=1/T is narrower than the spread spectrum, that is, the frequency spectrum occupied by the spread signal at the transmission line, if the number of mobile stations is not extraordinarily large, the frequency bandwidth of the up-link occupied by the entire system will be not have to be increased greatly.

Decision circuit 74 receives the integrated signal Z(t) expressed in equation (6), processes the integrated signal Z(t), demodulates the processed signal and then outputs the demodulated signal as a digital signal. At this time, decision circuit 74 determines the size and phase of the mixed and integrated signals transmitted from mobile stations M1-Mn, thereby deciding which data is finally output to output terminal 76.

Figure 6:
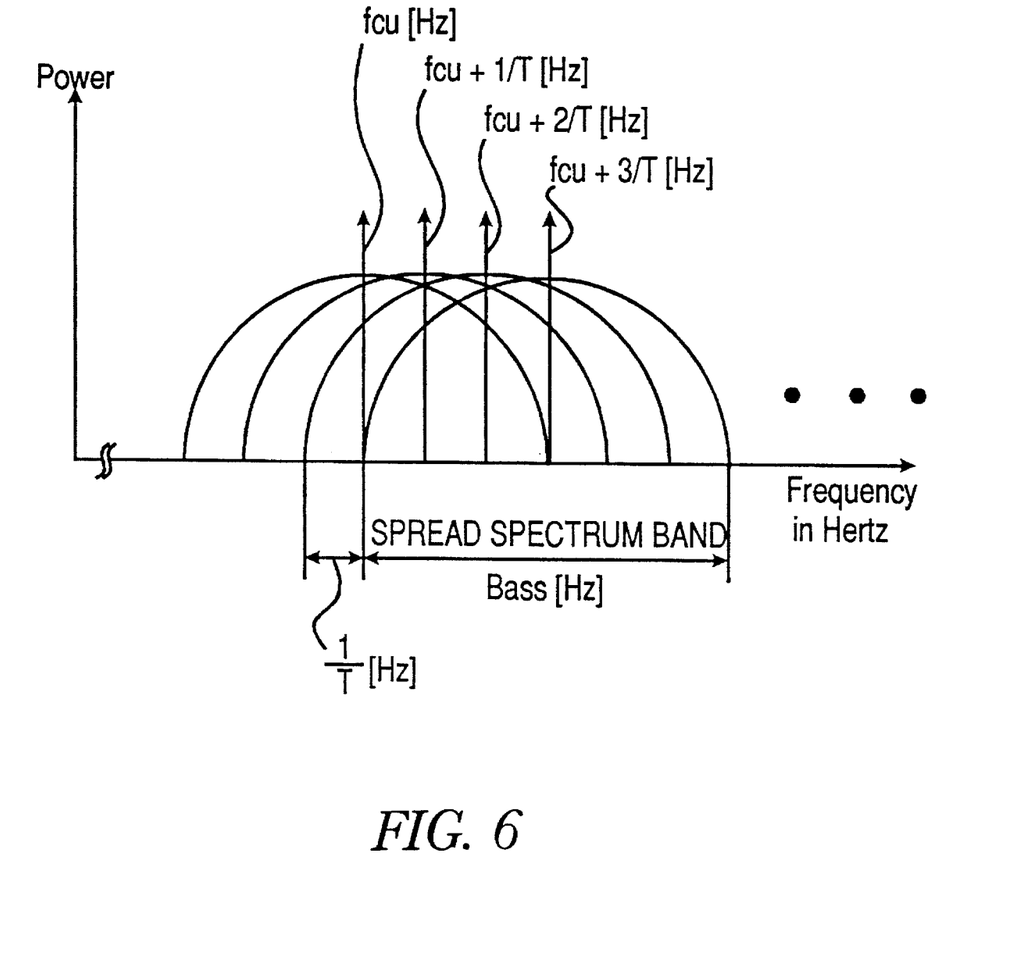
FIG. 6 illustrates the spread spectrum waveforms corresponding to the DS/SS-CDMA system of the present invention.

Referring now to FIG. 6, the spread spectrum waveforms corresponding to the DS/SS-CDMA system of the present invention are illustrated. As shown in FIG. 6 and described above, the DS/CDMA system of the present invention uses a frequency deviation shift, wherein each of the CDMA up-link channels has a spread spectrum that is separated from the other channels by a frequency band corresponding to the reciprocal of the transmission duration T. For example, a first up-link channel has a center frequency of fcu Hertz and a spread spectrum band of Bss Hertz, a second up-link channel has a center frequency of (fcu+(1/T)) Hertz and the spread spectrum band of Bss Hertz, a third up-link channel has a center frequency fcu+2/T Hertz and the spread spectrum band of Bss Hertz and a fourth up-link channel has the center frequency of (fcu+(3/T)) Hertz and the spread spectrum band of Bss Hertz.

When these waveforms are applied to FIGS. 4 and 5, the identification frequency (i.e. fid in FIG. 4 and fmid in FIG. 5) corresponds to the frequency deviation shift k/F, where "k" is an integer representative of the identification frequency. Accordingly, an arbitrary "k-th" up-link channel has a center frequency of (fcu+(k/T)) Hertz and the spread spectrum band of Bss Hertz.

As explained above, an up-link access apparatus of a DS/SS-CDMA system constructed according to the principles of the present invention can greatly reduce mutual interference between signals from respective mobile stations by shifting the carriers of the respective mobile stations by an identification frequency fid unique to each mobile station. As a result, when signals transmitted from the respective mobile stations are demodulated in the base station, the up-link access apparatus can effectively overcome the "near-far" problem occurring when one base station and a plurality of mobile stations perform multiple communication using the DS/SS-CDMA system.

What is claimed is:

1. An up-link access apparatus in a direct sequence spread spectrum code division multiple access system having a base station and a plurality of mobile stations, said apparatus comprising:

a transmitter for mixing base band data with a pseudo-noise code unique to a first of said plurality of mobile stations to generate a pseudo-noise code modulated signal, said transmitter then mixing said pseudo-noise code modulated signal with a carrier signal having a frequency shifted by an identification frequency unique to said first of said plurality of mobile stations to output a spread spectrum signal for transmission to said base station; and a receiver of said base station for mixing a demodulation carrier comprised of said pseudo-noise code and said carrier signal with said spread spectrum signal from said transmitter to output a mixed signal, said receiver then integrating said mixed signal to output an integrated signal and demodulating said integrated signal to output a digital signal.

2. The up-link access apparatus as claimed in claim 1, further comprised of said transmitter comprising:

a first pseudo-noise code generator for generating said pseudo-noise code unique to said first of said plurality of mobile stations;

a first mixer for mixing said base band data to be transmitted to said base station with said pseudo-noise code generated from said first pseudo-noise code generator to output said pseudo-noise code modulated signal;

a first up-link variable carrier generator for generating said carrier signal comprised of an up-link carrier frequency and said identification frequency unique to said first of said plurality of mobile stations; and a second mixer for mixing said pseudo-noise code modulated signal output from said first mixer with said carrier signal generated from said first up-link variable carrier generator to generate said spread spectrum signal for transmission to said base station.

3. The up-link access apparatus as claimed in claim 1, further comprised of said receiver comprising:

a pseudo-noise code generator for generating said pseudo-noise code unique to said first of said plurality of mobile stations;

an up-link variable carrier generator for generating said carrier signal having said frequency shifted by said identification frequency unique to said first of said plurality of mobile stations;

a first mixer for mixing said pseudo-noise code generated from said pseudo-noise code generator with said carrier signal generated from said up-link variable carrier generator to output said demodulation carrier;

a second mixer for mixing said spread spectrum signal transmitted from said transmitter with said demodulation carrier output from said first mixer to output said mixed signal;

an integrator for integrating said mixed signal and for outputting said integrated signal; and a decision circuit for determining a state of said integrated signal of said integrator and for recovering said integrated signal as said digital signal.

4. The up-link access apparatus as claimed in claim 2, further comprised of said receiver comprising:

a second pseudo-noise code generator for generating said pseudo-noise code unique to said first of said plurality of mobile stations;

a second up-link variable carrier generator for generating said carrier signal having said frequency shifted by said identification frequency unique to said first of said plurality of mobile stations;

a third mixer for mixing said pseudo-noise code generated from said second pseudo-noise code generator with said carrier signal generated from said second up-link variable carrier generator to output said demodulation carrier;

a fourth mixer for mixing said spread spectrum signal transmitted from said transmitter with said demodulation carrier output from said third mixer to output said mixed signal;

an integrator for integrating said mixed signal and for outputting said integrated signal; and a decision circuit for determining a state of said integrated signal of said integrator and for recovering said integrated signal as said digital signal.

5. The up-link access apparatus as claimed in claim 3, further comprised of each of said plurality of mobile stations having a different said identification frequency, each said identification frequency being different from each other said identification frequency by a frequency equal to an integer multiple of a reciprocal of a period of said integrator.

6. A method for perforating up-link access in a direct sequence spread spectrum code division multiple access system having a base station and a plurality of mobile stations, said method comprising the steps of:

- mixing base band data to be transmitted to said base station with a pseudo-noise code unique to a first one of said plurality of mobile stations to generate a pseudo-noise code modulated signal;

- generating an up-link carrier frequency comprised of a fixed carrier frequency shifted by an identification frequency unique to said first one of said plurality of mobile stations, each one of said plurality of mobile stations having a different said identification frequency;

- mixing said pseudo-noise code modulated signal with said up-link carrier frequency to generate a spread spectrum signal; and

- transmitting said spread spectrum signal from an output port of said first one of said plurality of mobile stations to said base station.

7. The method as claimed in claim 6, further comprising the steps of:

- receiving said spread spectrum signal at an input port of said base station;

- generating said up-link carrier frequency and said pseudo-noise code unique to said first one of said plurality of mobile stations;

- mixing said pseudo-noise code unique to said first one of said plurality of mobile stations with said up-link carrier frequency to generate a demodulation carrier signal;

- mixing said demodulation carrier signal with said spread spectrum signal to generate a mixed signal;

- integrating, according to a specified period, said mixed signal to generate an integrated result, said specified period having a reciprocal corresponding to differences in identification frequencies among each of said plurality of mobile stations; and

- demodulating said integrated result and outputting a digital signal.

8. A system for performing up-link access using direct access spread spectrum communication, comprising:

- a base station;
- a plurality of mobile stations;
- transmission means for transmitting data from a first of said plurality of mobile stations to said base station by mixing a pseudo-noise code modulated signal with an up-link carrier frequency to generate said data for transmission to said base station, said up-link carrier frequency comprised of a fixed carrier frequency shifted by a first identification frequency unique to said first of said plurality of mobile stations; and
- receiving means for receiving at said base station said data transmitted from said transmission means, mixing said data with a demodulation carrier to generate a mixed signal and integrating said mixed signal according to a specified period, said specified period having a reciprocal equal to an integer multiple of said first identification frequency.

9. The system for performing up-link access as claimed in claim 8, further comprised of said transmission means for mixing a pseudo-noise code unique to said first of said plurality of mobile stations with base band data to generate said pseudo-noise code modulated signal.

10. The system for performing up-link access as claimed in claim 8, further comprised of each one of said plurality of mobile stations using a different identification frequency wherein differences among identification frequencies of the respective mobile stations are equal to integer multiples of the reciprocal of said specified period of integration.

11. The system for performing up-link access as claimed in claim 8, further comprised of said receiving means for mixing a pseudo-noise code unique to said first of said plurality of mobile stations with said up-link carrier frequency to generate said demodulation carrier.

12. The system for performing up-link access as claimed in claim 9, further comprised of said receiving means for mixing said pseudo-noise code unique to said first of said plurality of mobile stations with said up-link carrier frequency to generate said demodulation carrier.

13. An up-link access apparatus in a direct sequence spread spectrum code division multiple access system having a base station and a plurality of mobile stations, said apparatus comprising:

- a transmitter for mixing base band data with a pseudo-noise code to generate a pseudo-noise code modulated signal, said transmitter then mixing said pseudo-noise code modulated signal with a carrier signal having a frequency shifted by an identification frequency unique to a first of said plurality of mobile stations to output a spread spectrum signal for transmission to said base station; and

- a receiver of said base station for mixing a demodulation carrier comprised of said pseudo-noise code and said carrier signal with said spread spectrum signal from said transmitter to output a mixed signal, said receiver then integrating said mixed signal to output an integrated signal and demodulating said integrated signal to output a digital signal.

14. The up-link access apparatus as claimed in claim 13, further comprised of said transmitter comprising:

- a first pseudo-noise code generator for generating said pseudo-noise code;

- a first mixer for mixing said base band data to be transmitted to said base station with said pseudo-noise code generated from said first pseudo-noise code generator to output said pseudo-noise code modulated signal;

- a first up-link variable carrier generator for generating said carrier signal comprised of an up-link carrier frequency and said identification frequency unique to said first of said plurality of mobile stations; and

- a second mixer for mixing said pseudo-noise code modulated signal output from said first mixer with said carrier signal generated from said first up-link variable carrier generator to generate said spread spectrum signal for transmission to said base station.

15. The up-link access apparatus as claimed in claim 13, further comprised of said receiver comprising:

- a pseudo-noise code generator for generating said pseudo-noise code;

- an up-link variable carrier generator for generating said carrier signal having said frequency shifted by said identification frequency unique to said first of said plurality of mobile stations;

- a first mixer for mixing said pseudo-noise code generated from said pseudo-noise code generator with said carrier signal generated from said up-link variable carrier generator to output said demodulation carrier;

- a second mixer for mixing said spread spectrum signal transmitted from said transmitter with said demodulation carrier output from said first mixer to output said mixed signal;

an integrator for integrating said mixed signal and for outputting said integrated signal; and a decision circuit for determining a state of said integrated signal and for recovering said integrated signal as said digital signal.

16. The up-link access apparatus as claimed in claim 15, further comprised of each of said plurality of mobile stations having a different said identification frequency, each of said different identification frequencies differing by a frequency equal to an integer multiple of a reciprocal of a period of said integrator.

17. A method for performing up-link access in a direct sequence spread spectrum code division multiple access system having a base station and a plurality of mobile stations, said method comprising the steps of:

mixing base band data to be transmitted to said base station with a pseudo-noise code to generate a pseudo-noise code modulated signal;

generating an up-link carrier frequency comprised of a fixed carrier frequency shifted by an identification frequency unique to a first one of said plurality of mobile stations, each one of said plurality of mobile stations having a different said identification frequency;

mixing said pseudo-noise code modulated signal with said up-link carrier frequency to generate a spread spectrum signal; and transmitting said spread spectrum signal from an output port of said first one of said plurality of mobile stations to said base station.

18. The method as claimed in claim 17, further comprising the steps of:

receiving said spread spectrum signal at an input port of said base station;

generating said up-link carrier frequency and said pseudo-noise code;

mixing said pseudo-noise code with said up-link carrier frequency to generate a demodulation carrier signal;

mixing said demodulation carrier signal with said spread spectrum signal to generate a mixed signal;

integrating, according to a specified period, said mixed signal to generate an integrated result, said specified period having a reciprocal corresponding to differences in identification frequencies among each of said plurality of mobile stations; and demodulating said integrated result and outputting a digital signal.

19. A system for performing up-link access using direct access spread spectrum communication, comprising:

a base station;

a plurality of mobile stations;

transmission means for transmitting data from said plurality of mobile stations to said base station by mixing pseudo-noise code modulated signals with up-link carrier frequencies to generate said data for transmission to said base station, each one of said up-link carrier frequencies comprised of a fixed carrier frequency shifted by an identification frequency unique to a respective one of said plurality of mobile stations; and receiving means for receiving at said base station said data transmitted from said transmission means, mixing said data with demodulation carriers to generate mixed signals and integrating said mixed signals according to specified periods, said specified periods each having a reciprocal equal to an integer multiple of a corresponding said identification frequency.

20. The system for performing up-link access as claimed in claim 19, further comprised of said transmission means for mixing pseudo-noise codes respectively unique to said plurality of mobile stations with base band data to generate said pseudo-noise code modulated signals.

* * * * *